(12) United States Patent
Joo (10) Patent No.: US 8,233,942 B2
(45) Date of Patent: Jul. 31, 2012

(54) MOBILE TERMINAL

(75) Inventor: Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 11/944,351

(22) Filed: Nov. 21, 2007

(65) Prior Publication Data

US 2008/0305838 A1 Dec. 11, 2008

(30) Foreign Application Priority Data

Jun. 8, 2007 (KR) .................. 10-2007-0056296

(51) Int. Cl.
*H04B 1/38* (2006.01)
*H04M 1/00* (2006.01)

(52) U.S. Cl. ............... 455/566; 455/575.1; 455/550.1

(58) Field of Classification Search .............. 455/566
See application file for complete search history.

(56) References Cited

U.S. PATENT DOCUMENTS

| | | | | |
|---|---|---|---|---|
| 4,274,093 | A * | 6/1981 | Judge | 345/174 |
| 6,246,862 | B1 * | 6/2001 | Grivas et al. | 455/566 |
| 6,636,203 | B1 * | 10/2003 | Wong et al. | 345/173 |
| 7,027,036 | B2 * | 4/2006 | Yang | 345/170 |
| 7,388,571 | B2 * | 6/2008 | Lowles et al. | 345/104 |
| 2004/0248621 | A1 * | 12/2004 | Schon | 455/566 |
| 2005/0009581 | A1 * | 1/2005 | Im et al. | 455/575.4 |
| 2006/0181517 | A1 * | 8/2006 | Zadesky et al. | 345/173 |
| 2006/0205432 | A1 | 9/2006 | Hawkins et al. | |
| 2007/0049358 | A1 | 3/2007 | Kang et al. | |
| 2008/0055264 | A1 * | 3/2008 | Anzures et al. | 345/173 |

FOREIGN PATENT DOCUMENTS

| | | |
|---|---|---|
| DE | 199 51 218 A1 | 4/2001 |
| DE | 102 23 976 A1 | 1/2004 |
| DE | 10 2004 041 895 A1 | 3/2006 |
| EP | 1 569 077 A1 | 8/2005 |
| JP | 2006318905 A | 11/2006 |
| KR | 102004009987 A | 12/2004 |
| KR | 102004010356 A | 12/2004 |
| WO | WO-2006/045209 A2 | 5/2006 |

* cited by examiner

*Primary Examiner* — Lester Kincaid
*Assistant Examiner* — Andy Gu
(74) *Attorney, Agent, or Firm* — Birch, Stewart, Kolasch & Birch, LLP (57) ABSTRACT

A mobile terminal in provided. The mobile terminal includes a housing having at least one manipulation part, a signal display unit located in the housing, the signal display unit being configured to selectively display one of at least two inputable signal sets, the selectively displayed inputable signal set being visible through the at least one manipulation part, and an input unit located in the housing, the input unit being configured to receive at least one signal corresponding to the selectively displayed inputable signal set.

32 Claims, 5 Drawing Sheets

MOBILE TERMINAL

CROSS REFERENCE TO RELATED APPLICATIONS

This application claims priority to Korean Patent Application No. 10-2007-0056296, filed Jun. 8, 2007, which is herein incorporated by reference.

BACKGROUND OF THE INVENTION

1. Field of the Invention

The present invention relates generally to mobile terminals, and more particularly to a mobile terminal having a selection input unit that selectively displays one of at least two inputable signal sets for inputting various types of signals or commands according to user manipulation.

2. Description of Related Art

In general, a mobile terminal is a portable electronic device that implements a wireless communication function while having a size and weight that a user may easily carry around. In order to perform the wireless communication function, a certain signal or command is to be inputted to the terminal. Generally, the mobile terminal may have other functions such as video or image display, in addition to the wireless communication function.

Because there are many types of signals inputted by the user depending on the various functions of the mobile terminal, many different types of signals are printed on a portion of the mobile terminal, such as input devices, for expressing the inputted signals. As such, it makes it difficult for the user to recognize the various signals provided on the input devices.

In an effort to solve the problem, the portion where signals are printed may be enlarged. This creates its own problems in that the overall size of the mobile terminal is increased, which is in direct conflict with a user's desire to have a smaller, more portable terminal.

BRIEF SUMMARY OF THE INVENTION

Therefore, in order to address the above matters the various features described herein have been conceived. One aspect of the exemplary embodiments is to allow a user to easily recognize signals inputted according to user manipulation.

According to principles of this invention, a mobile terminal in provided. The mobile terminal includes a housing having at least one manipulation part, a signal display unit located in the housing, the signal display unit being configured to selectively display one of at least two inputable signal sets, the selectively displayed inputable signal set being visible through the at least one manipulation part, and an input unit located in the housing, the input unit being configured to receive at least one signal corresponding to the selectively displayed inputable signal set.

According to an aspect of the present invention, a surface of the manipulation part that faces the signal display unit may be substantially smooth.

According to another aspect of present invention, the at least one manipulation part may be formed of a material that allows light to be transmitted therethrough to display the selectively displayed inputable signal set.

According to still another aspect of the present invention, each of the at least two inputable signal sets may include one of one or more numbers, one or more symbols, one or more images, one or more characters representative of a language, one or more menus, or any combinations thereof.

According to yet another aspect of the present invention, the mobile terminal may include a light source located in the housing to generate light, and a light guiding part to guide the generated light towards the manipulation part. The fight guiding part may be located between the input unit and the signal display unit.

According to a further aspect of the present invention, the light guiding part may be a film located at a lower side of the manipulation part, and the film may include a diffusion pattern located at a position corresponding to the manipulation part.

According to a different aspect of the present invention, the mobile terminal includes a light source configured to generate light, and the at least one manipulation part may include a diffusion pattern located at a surface of the at least one manipulation part adjacent the light source.

According to another aspect of the present invention, the input unit may include one of a touch screen disposed at an upper side of the signal display unit and a dome switch disposed at a lower side of the signal display unit.

According to still another aspect of the present invention, the housing may include a plurality of key holes, the at least one manipulation part may include a plurality of manipulation keys, and each of the plurality of manipulation keys may be disposed in a corresponding key hole of the plurality of key holes such that each of the plurality of manipulation keys can be manipulated.

According to a further aspect of the present invention, the input unit may include a plurality of dome switches, and each dome switch is associated with a corresponding manipulation key of the plurality of manipulation keys.

According to a different aspect of the present invention, the manipulation part may be made of a ductile material.

According to a further aspect of the present invention, the input unit may include a plurality of dome switches located at a lower side of the signal display unit, and the at least one manipulation part may include a single pad having a size corresponding to the area where the plurality of dome switches are located.

According to still another aspect of the present invention, the input unit may include a touch screen located at an upper side of the signal display unit, and at least one dome switch located at a lower side of the signal display unit. When one of the touch screen and the dome switch is activated, the other is deactivated.

According to another aspect of the present invention, the mobile terminal may include a signal set determining unit electrically connected with the signal display unit. The signal set determining unit selects one of the at least two inputable signal sets to be displayed by the signal display unit.

According to a further aspect of the present invention, the mobile terminal includes a signal set input unit located at the housing. The signal set input unit may be electrically connected with the signal set determining unit to generate a signal for selecting one of the at least two inputable signal sets to be displayed by the signal display unit.

According to yet another aspect of the present invention, the housing may include a first body slidably supported by the second body, the first body may include a display, and the second body may include the at least one manipulation part.

According to still another aspect, the housing may include a first cover, a second cover, and the at least one manipulation part located in the front cover.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

The mobile terminal according to exemplary embodiments of the present invention will now be described with reference to the accompanying drawings. Wherever possible, the same or similar reference numerals are given to the same or similar elements as those in the former embodiment and subsequent description will not be repeated if not necessary.

Figure 1:
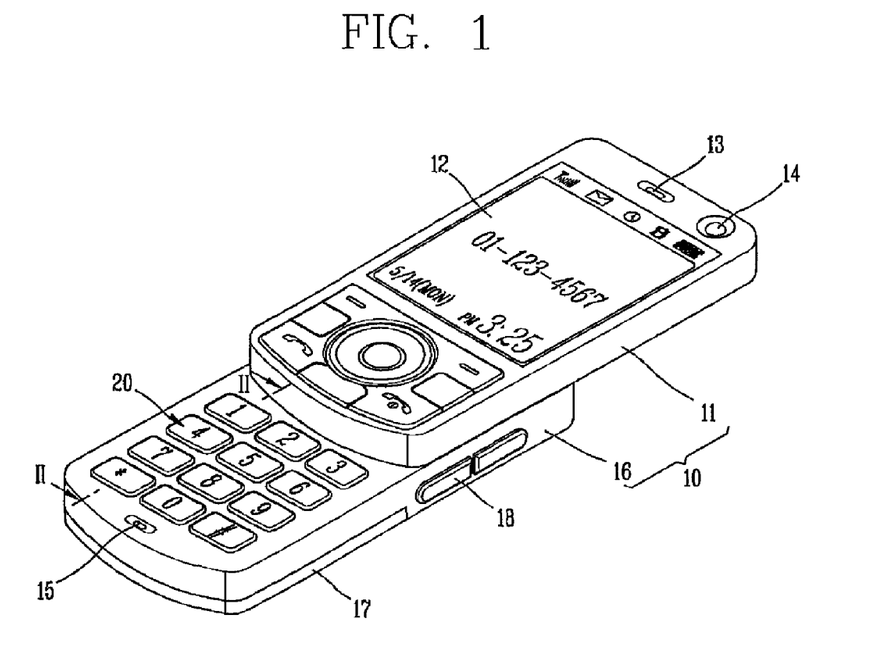
FIG. 1 shows a perspective view of a mobile terminal according to a first exemplary embodiment of the present invention.

FIG. 1 is a perspective view of a mobile terminal according to a first exemplary embodiment of the present invention. In this exemplary embodiment, the mobile terminal includes a wireless communication module (not shown) to perform a wireless communication function. The mobile terminal is presented as an example of a portable electronic device, and without being limited thereto, the mobile terminal can be any one of a PDA, a portable game player, a portable music player, and a portable calculator, or any other portable electronic devices in which signals are to be inputted by a user.

As seen in FIG. 1, a housing 10 forms a body of the mobile terminal. The housing 10 may include a first or upper body 11 and a second or lower body 16 that is slidably connected to the upper body 11. A display 12, a receiver 13, and a camera 14 may be located on an upper portion of the upper body 11. At least one manipulation part 20 for receiving a signal or a command according to user manipulation and a microphone 15 may be located on a lower portion of the lower body 16. A battery 17 and a side key 18 may be mounted at the lower body 16, and a second camera (not shown) having a different image capturing direction as that of the camera 14 may also be located at the lower body 16. The construction of the manipulation part 20 will be described with reference to FIG. 2.

Figure 2:
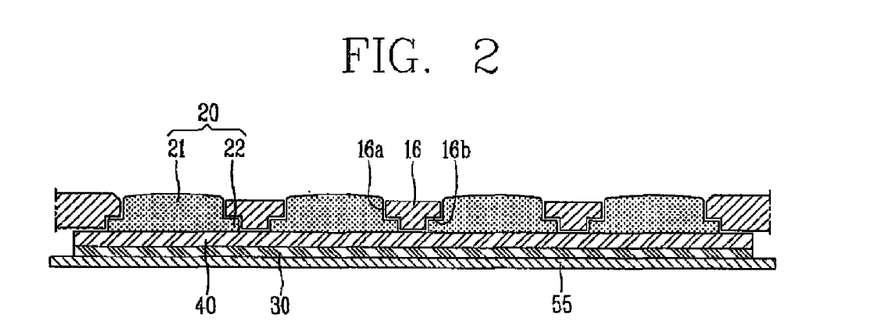
FIG. 2 shows a partial section view taken along line II-II in FIG. 1.

As seen in FIG. 2, the manipulation part 20 includes one or more manipulation keys 21 respectively disposed in key holes 16a of the lower body 16. At least one end portion of the key 21 is formed as a flange part 22 extending to be larger than upper portion thereof. The flange part 22 is held by a stopping part 16b formed nearing a stepped relationship near the key hole 16a. The stopping part 16b along with the flange part 22 assist in preventing the manipulation key 21 from being released from the lower body 16. A lower surface of the manipulation key 21 may be formed to substantially smooth. The manipulation part 20 may be transparent to allow light transmission therethrough, and may be made from a plastic or other suitable material.

As also seen in FIG. 2, a signal display unit 30 and an input unit 40 are located at a lower side of the manipulation part 20. The signal display unit 30 may display one of several different input signal sets as well as display image and video or the like. For this purpose, the signal display unit 30 may be an LCD or an OLED and may be supported by a circuitry supporting substrate 55. The different signal sets may be a combination of one or more numbers, one or more symbols, one or more images, one or more characters representative of at least one language (e.g., a combination of characters in an alphabet). Also, the signal sets may include various menus. Finally, the different signal sets may include combinations of any of the foregoing.

As seen in FIG. 2, the input unit 40 may be disposed at an upper side of the signal display unit 30 to correspond to the manipulation part 20. The input unit 40 receives a signal according to a touching operation of the manipulation part 20. For example, the input unit 40 can be a touch screen. The touch screen may be any of an electrostatic capacity type touch screen and a pressure-sensitive type touch screen, and is formed to be transparent to allow light to be transmitted therethrough.

With such a construction, the signal display unit 30 displays a signal set determined according to a program or selected according to a command inputted by the user. The displayed signal set is visible through the input unit 40 and the manipulation part 20. The user touches a manipulation part 20 displaying a desired signal of the signal set to input the desired signal to the mobile terminal through the input unit 40. For example, as seen in FIG. 1, when the numbers displayed by the signal display unit 30 are displayed through the manipulation part 20, the manipulation part 20 is operated to display the numbers inputted through the input unit 40 on the display 12.

The user may change a signal set displayed by the signal display unit 30 by touching one of the keys 21 or manipulating a hot key such as the side key 18 (in FIG. 1). For example, when the side key 18 is pressed in a mode where numbers are displayed, as seen in FIG. 1, a combination of alphabets or Hangul (Korean) consonants and vowels may be displayed through the manipulation part 20. Here, the side key 18 or the like may be a signal set input part in the sense that the user can input a desired mode therethrough, and the circuitry supporting substrate 55 can be a signal set determining unit in the sense that the signal set determining unit determines the selected mode for the signal display unit 30 to display and displays the selected mode through the manipulation part according to a command received through the signal set input unit.

Because a lower portion of the manipulation part 20 is not stepped but r smooth, light generated from the signal display unit 30 is not distorted in the process of passing through the manipulation part 20. As a result, the user can clearly recognize the signal set displayed through the manipulation part 20.

Figure 3:
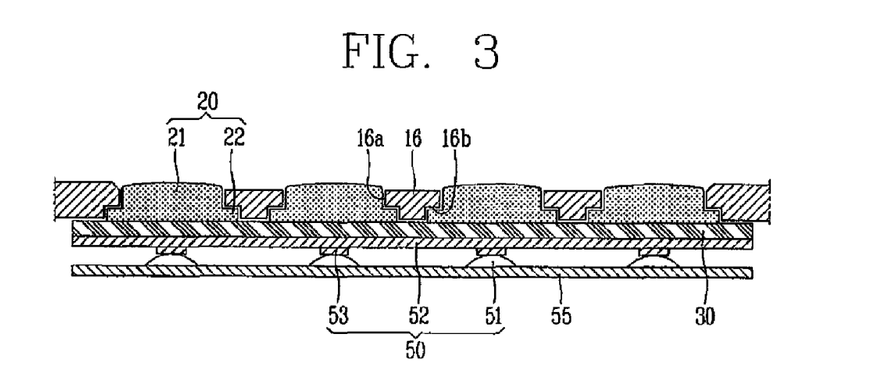
FIG. 3 shows a partial section view of a modification of the mobile terminal according to the first exemplary embodiment of the present invention.

In the exemplary modification seen in FIG. 3, the manipulation part 20 or the signal display unit 30 is substantially the same as those in the former exemplary embodiment of the present invention, except that input unit 40 may be replace with input unit 50, which includes one or more dome switches 51.

The dome switches 51 may be made of a material with elastic restoration force, such as, but not limited thereto, metal, and are disposed on the circuitry supporting substrate 55 such that they correspond to the respective manipulation keys 21. The signal display unit 30 is a display that can be bent like an e-paper or a flexible LCD, so that when one of the manipulation keys 21 is pressed, a corresponding pressing force can be transferred to a corresponding one of the dome switches 51. Upon receiving the pressing force, the corresponding dome switch 51 is elastically deformed to come in contact with the circuitry supporting substrate 55 to allow separated contacts (not shown) to be electrically connected to allow a signal to be inputted to the circuitry supporting substrate 55.

Pressing protrusions 53 protruded from a support film or pad 52 may be formed to correspond to the dome switches 51. The support pad 52 is disposed at a lower portion of the signal display unit 30, and when the manipulation keys 21 are pressed, the pressing protrusions 53 press the dome switches 51.

According to this configuration, when the manipulation part 20 is manipulated, a click sensation can be obtained by the restoration force of the dome switches 51. In addition, the click sensation can be improved by the pressing protrusions 53.

Figure 4:
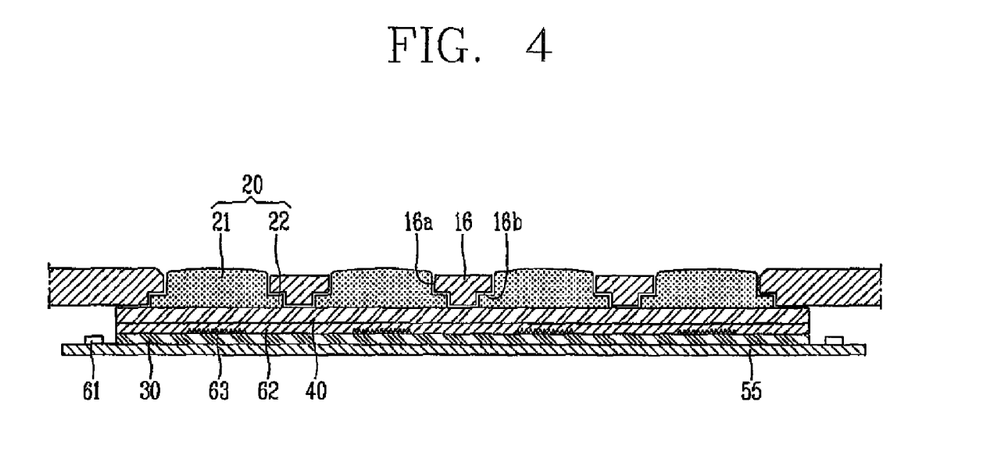
FIG. 4 shows a partial section view of a portion of a mobile terminal according to a second exemplary embodiment.

As seen in FIG. 4, a second exemplary embodiment of the present invention additionally includes a light source 61, a light guiding part 62, and diffusion patterns 63 as compared to the first exemplary embodiment of the present invention.

In this exemplary embodiment, the light source 61 generates light and may be, for example, an LED. While the light source 61 is shown on the circuitry supporting substrate 55, the light source 61 may be provided at other locations in the housing of the mobile terminal.

The light generated from the light source 61 is guided toward the manipulation part 20 through the light guiding part 62. The light guiding part 62 may be disposed at an upper portion of the signal display unit 30. The light guiding part 62 may be, for example a light guiding member or a light guiding film having the diffusion patterns 63 formed therein. The diffusion patterns 63 may be formed at positions corresponding to the manipulation keys 21.

In this configuration, when the signal display unit 30 is not illuminated by itself or when the signal display unit 30 is illuminated by itself but its light strength is weak, light from the light source 61 can supplement the light from the signal display unit 30. In other words, the light generated from the light source 61 is guided to the manipulation part 20 after passing through the light guiding part 62 and, as a result of being diffused by the diffusion patterns 63, the signal set displayed by the signal display unit 30 can be more clearly recognized through the manipulation part 20.

Figure 5:
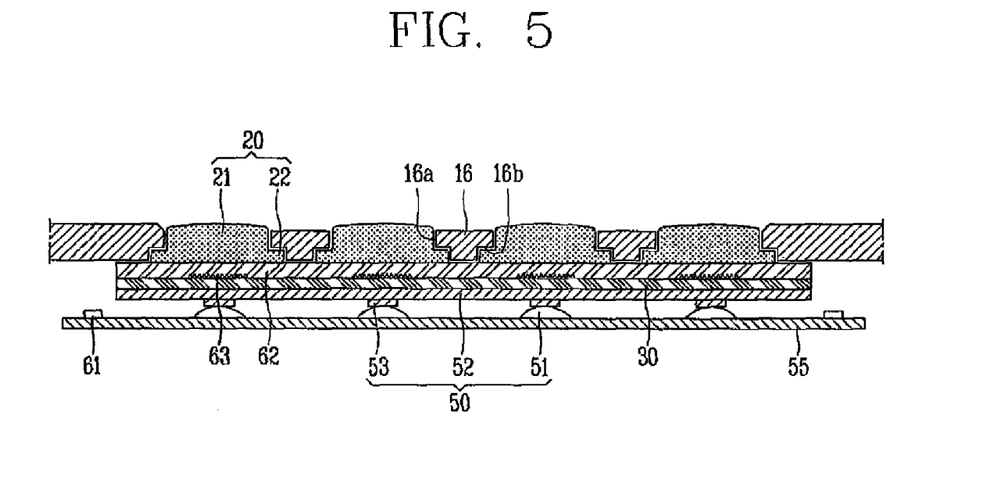
FIG. 5 shows a partial section view of a modification of the mobile terminal according to the second exemplary embodiment of the present invention.

As seen in FIG. 5, the light source 61, light guiding part 62, and diffusion patterns 63 may be utilized with the dome switches shown in FIG. 3. With this modification, the user obtains the enhanced visibility of the signal set displayed by the signal display unit 30 by light generated from the light source 61 and also obtains the click sensation during pressing of the manipulation part 20.

Figure 6:
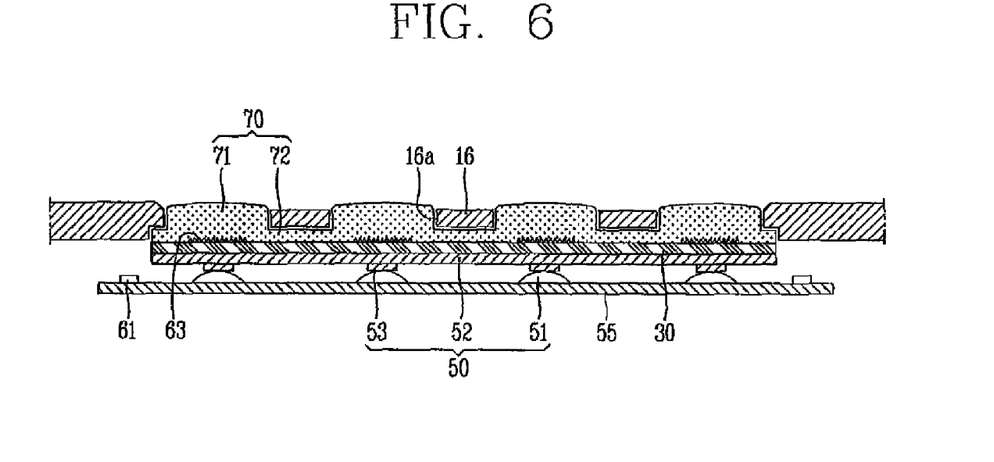
FIG. 6 shows a partial section view of a portion of a mobile terminal according to a third exemplary embodiment of the present invention.

In accordance with a third exemplary, as seen in FIG. 6, a manipulation part 70 includes a support pad 72 that connects a plurality of keys 71 exposed through the key holes 16a. The manipulation part 70 may be made of a ductile material, such as, but not limited thereto, rubber or silicon. Exposed portions of the keys 71 may be formed to be concave with a certain curvature.

In addition, the light guiding part 62 (in FIG. 5) for guiding the light generated from the light source 61 to the manipulation part 70 may be eliminated and diffusion patterns 63 can be directly formed at a lower side of the support pad 72.

In this arrangement, because the support pad 72 is ductile, when one of the keys 71 is pressed, only a corresponding dome switch is pressed, so a phenomenon that other dome switches are unintentionally pressed to erroneously input a signal can be minimized or prevented.

If the manipulation part 70 is made of rubber, it can be formed to be thinner so that the click sensation generated when the manipulation part 70 is pressed can be more improved as compared to a manipulation part 70 made of other materials. As a result the overall thickness of the mobile terminal can be reduced. In addition, because the light guiding part is not necessary, the overall thickness of the mobile terminal can become even further reduced.

In this exemplary embodiment of the present invention, the input unit 40 may be a touch screen (refer to FIG. 4) similar to that described. In this configuration, because the manipulation part 70 is made of rubber, even if the touch screen 40 is implemented as a pressure-sensitive type, the touch screen can be used when the manipulation part 70 is manipulated by using a stylus pen.

Figure 7:
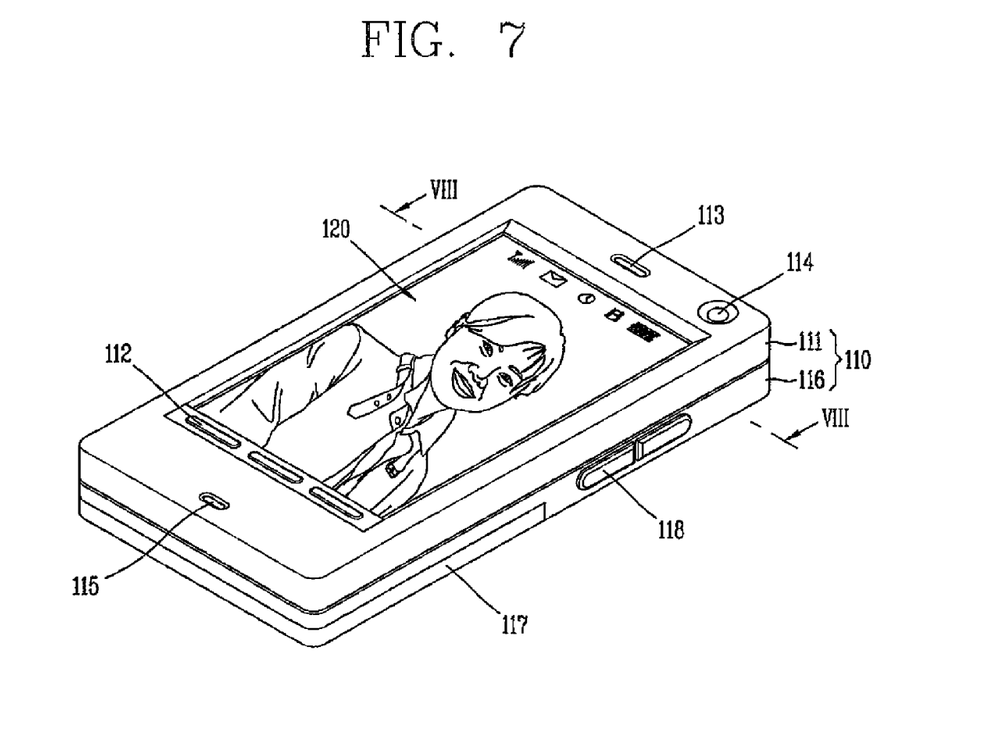
FIG. 7 shows a perspective view of a mobile terminal according to a fourth exemplary embodiment of the present invention.

According to a fourth exemplary embodiment, as seen in FIG. 7, a housing 110 forms a body of the mobile terminal. The housing may include a first cover or an upper cover 111 and a second cover or a lower cover 116. A manipulation part 120 may be located on the upper portion of a front surface of the upper cover 111. A manipulation key 112, a microphone 115, a receiver 113, and a camera 114 may be disposed to be adjacent end portions of the manipulation part 120. A battery 117 and a side key 118 may be mounted at the lower cover 116. In addition a second camera (not shown) having a different image capture direction from that of the camera 114 may be located in the lower cover 116. The construction of the manipulation part 120 will be described with reference to FIG. 8.

Figure 8:
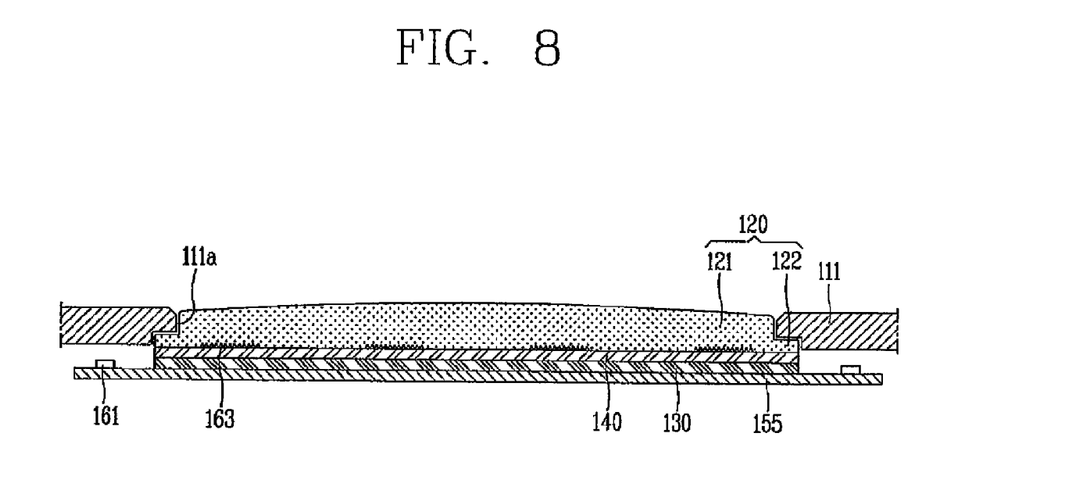
FIG. 8 shows a partial section view taken along line VI-VI in FIG. 7.

As seen in FIG. 8, the manipulation part 120 includes a manipulation region 121 and a flange part 122 that extends outward from the manipulation region 121. The flange part 122 is held by a manipulation hole 111a in the front cover 111, which is configured to occupy a substantial area of the upper cover 111, and the manipulation region extends through the manipulation hole 111a. Similarly to the above-described exemplary embodiments of the present invention, the manipulation part 120 may be made of ductile rubber so that it can be thin and have a rounded form. Diffusion patterns 163 for guiding light generated from the light source 161 may be formed at a lower portion of the manipulation part 120 similar to the arrangement of diffusion patterns 63 as seen in FIG. 6.

In this exemplary embodiment, because of the presence of the diffusion patterns 163, the light generated from the light source 161 can be evenly guided to each portion of the manipulation part 120. Accordingly, the user may touch a portion of the manipulation part 120 where a desired signal is displayed by the signal display unit 130 to input the desired signal to the input unit 140, which may take the form of a touch screen as described above.

In addition, the signal display unit 130 may display not only the signal set but also other images or video, so there is no need to provide an additional display (Eke the display 12 in FIG. 1) in the mobile terminal. For example, as seen in FIG. 7, the mobile terminal may display an image provided through the manipulation part 120 when the signal display unit 130 displays the image or the video.

Moreover, because the manipulation part 120 may occupy the portion forming a portion of the external appearance of the terminal, in particular, most of the portion of the upper cover 111, the mobile terminal may advantageously have a neat and elegant external appearance.

Figure 9:
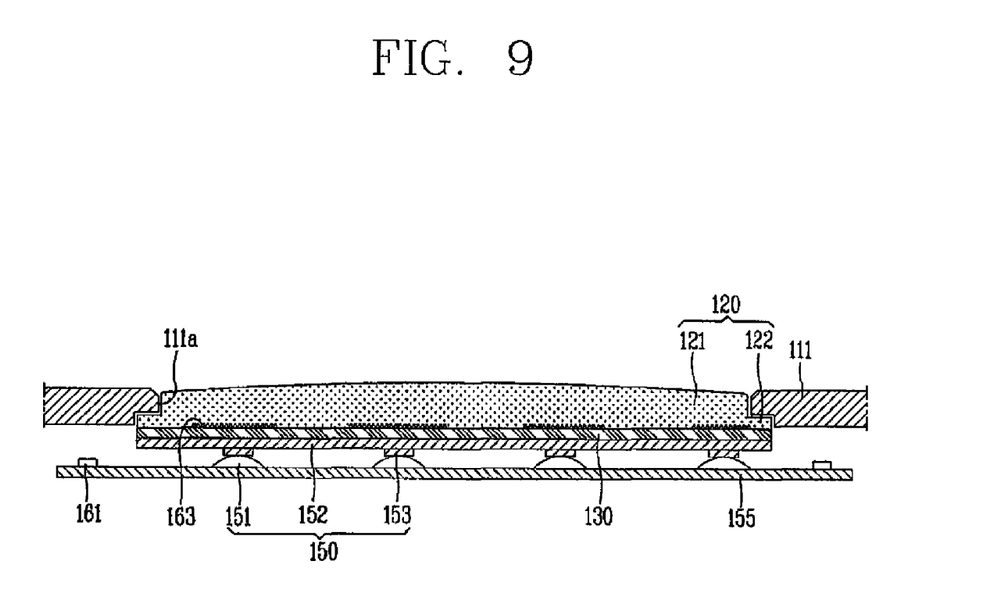
FIG. 9 shows a partial section view of a modification of the mobile terminal according to the fourth exemplary embodiment of the present invention.

In one modification of the mobile terminal according to the fourth exemplary embodiment of the present invention, as seen in FIG. 9, an input unit 150 including one or more dome switches 151 is provided in place of the input unit 140. The input unit 150 includes a support pad 152 and pressing protrusions 153 similar to the input 50 described above.

Figure 10:
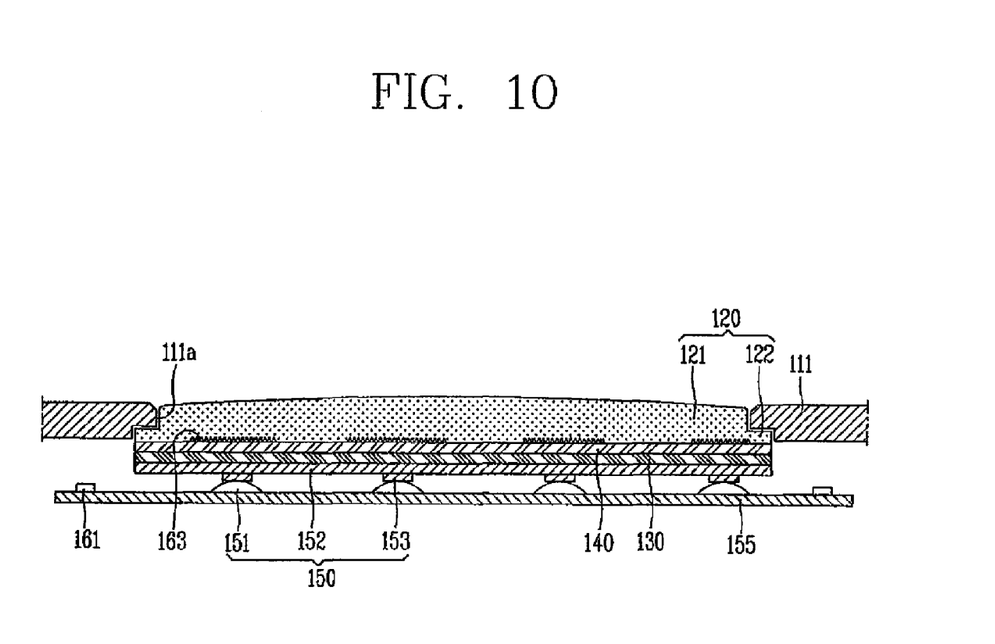
FIG. 10 shows a partial section view of a another modification of the mobile terminal according to the fourth exemplary embodiment of the present invention.

As seen in FIG. 10, another modification of the fourth exemplary embodiment includes both the input unit 140 (the first input unit), which may be a touch screen, that is disposed at a lower side of the manipulation part 120, and the input unit 150 (the second input unit), which includes one or more dome switches 151, is disposed at a lower side of the signal display unit 130 supporting the first input unit 140. When the second input unit 150 is operated according to manipulation of the manipulation region 121, the user may have an improved click sensation.

When the user presses or touches the manipulation region 121 with a weak force, only the first input unit 140 may react thereto. When the force reaches beyond a certain level, the second input unit 150 may also be operated, for which an additional adjustment may be necessary.

Figure 11:
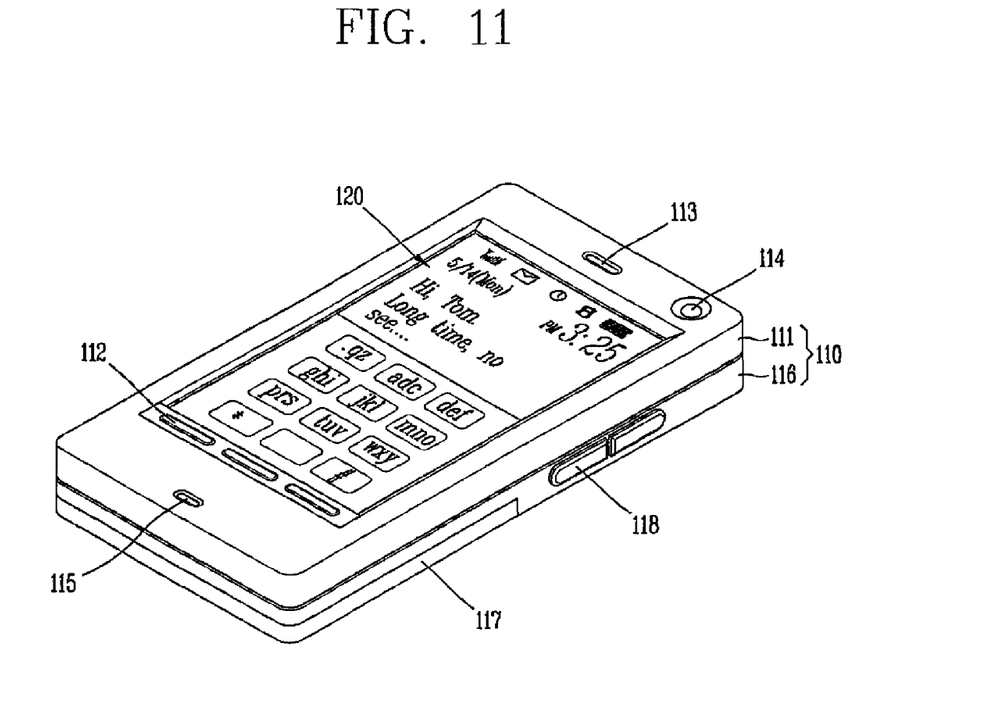
FIG. 11 shows a perspective view of the mobile terminal in FIG. 7 where a signal is inputted by using the mobile terminal in FIG. 7.

For the adjustment, the first input unit 140 may be locked depending on a particular usage mode. For example, when the signal display unit 130 displays a standardized signal or command such as an alphabet signal set, which may be in the form of a virtual keyboard, to input an English word (See FIG. 11), a control unit such as the circuitry supporting substrate 155 may lock the first input unit 140.

Figure 12:
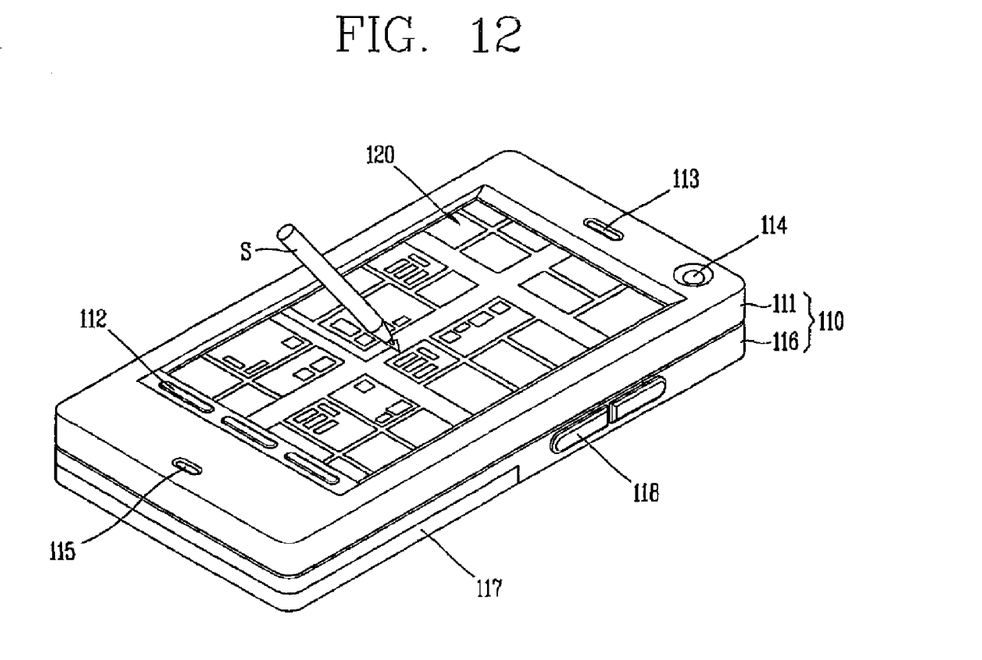
FIG. 12 shows a perspective view of the mobile terminal in FIG. 7 where a figure (diagram) is inputted through a manipulation region of the mobile terminal in FIG. 7.

When the user selects an input mode to make a figure (drawing) on the manipulation region 121 by using the stylus pen (See FIG. 12), the second input unit 150 may be locked and only the first input unit 140 may be operated.

In this arrangement, the user may activate the first input unit 140 to input various types of signals or information to the mobile terminal. In addition, when the second input unit 150 is activated, the standardized signal can be more quickly inputted. Consequently, the first and second input units 140 and 150 have a mutually complementary relationship according to the type of signals desired to be inputted by the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A mobile terminal comprising:
   a housing;
   a liquid crystal display (LCD) disposed within the housing, the LCD being configured to selectively display one of at least two inputtable signal sets or other visual information different from the inputtable signal sets;
   a manipulation unit disposed within the housing to cover the LCD, the manipulation unit being configured to allow light to be transmitted therethrough; and
   an input unit disposed within the housing, the input unit being configured to receive at least one signal corresponding to the selectively displayed inputtable signal set,
   wherein the input unit comprises:
   a touch sensor disposed above the LCD and configured to sense a touch when the manipulation unit is touched;
   a support pad disposed at a rear surface of the LCD so as to support the LCD;
   a circuitry supporting substrate disposed below the LCD;
   at least one dome switch mounted at the circuitry supporting substrate and configured to be operated when being depressed by the LCD via the manipulation unit; and
   at least one pressing protrusion protruding from the support pad and formed to correspond to the at least one dome switch,
   wherein the manipulation unit entirely covers the LCD,
   wherein the housing includes a through hole and the manipulation unit is disposed in the through hole, and
   wherein the touch sensor senses a touched position when the manipulation unit is touched, and the LCD outputs information associated with the touched position when the at least one dome switch is pressed by the LCD.

2. The mobile terminal of claim 1, wherein of all the surfaces of the manipulation unit, the surface that faces the LCD is formed to be smooth without a step.

3. The mobile terminal of claim 1, wherein the signal sets include a combination of at least one number, symbol or image, a combination of characters for receiving at least one language, or a combination of a plurality of menus.

4. The mobile terminal of claim 1, further comprising:
   a light source disposed within the housing and configured to emit light; and
   a light guide unit configured to guide emitted light toward the manipulation unit.

5. The mobile terminal of claim 4, wherein the light guide unit is disposed at a lower side of the manipulation unit, the light guide unit being a light guide film having diffusion patterns, the light guide unit being formed at a position corresponding to the manipulation unit.

6. The mobile terminal of claim 4, wherein the manipulation unit is made of a flexible member, and the light guide unit includes diffusion patterns formed on a surface of the manipulation unit adjacent to the light source.

7. The mobile terminal of claim 1, wherein the manipulation unit is made of a flexible member.

8. The mobile terminal of claim 7, wherein the at least one dome switch is a plurality of dome switches, and the manipulation unit includes a single pad corresponding to a region where the plurality of dome switches are disposed.

9. The mobile terminal of claim 1, wherein the touch sensor includes a touch screen, and
wherein when one of the touch screen and the dome switch is activated, the other of the touch screen and dome switch is deactivated.

10. The mobile terminal of claim 1, further comprising:
a signal set determining unit electrically connected to the LCD, the signal set determining unit being configured to determine the displayed signal set.

11. The mobile terminal of claim 10, further comprising:
a signal set input unit disposed in the housing such that it is electrically connected with the signal set determining unit, the signal set input unit being configured to receive a signal for determining the displayed signal set.

12. The mobile terminal of claim 1, wherein an outer surface of the manipulation unit is formed to be smooth.

13. The mobile terminal of claim 12, wherein the manipulation unit is a single pad corresponding to a region from which the LCD outputs visual information.

14. The mobile terminal of claim 2, wherein an outer surface of the manipulation unit is formed to be smooth.

15. The mobile terminal of claim 14, wherein the manipulation unit is a single pad corresponding to a region from which the LCD outputs visual information.

16. The mobile terminal of claim 3, wherein an outer surface of the manipulation unit is formed to be smooth.

17. The mobile terminal of claim 16, wherein the manipulation unit is a single pad corresponding to a region from which the LCD outputs visual information.

18. The mobile terminal of claim 6, wherein an outer surface of the manipulation unit is formed to be smooth.

19. The mobile terminal of claim 18, wherein the manipulation unit is a single pad corresponding to a region from which the LCD outputs visual information.

20. The mobile terminal of claim 7, wherein an outer surface of the manipulation unit is formed to be smooth.

21. The mobile terminal of claim 19, wherein the manipulation unit is a single pad corresponding to a region from which the LCD outputs visual information.

22. The mobile terminal of claim 8, wherein an outer surface of the manipulation unit is formed to be smooth.

23. The mobile terminal of claim 22, wherein the manipulation unit is a single pad corresponding to a region from which the LCD outputs visual information.

24. The mobile terminal of claim 9, wherein an outer surface of the manipulation unit is formed to be smooth.

25. The mobile terminal of claim 24, wherein the manipulation unit is a single pad corresponding to a region from which the LCD outputs visual information.

26. The mobile terminal of claim 11, wherein an outer surface of the manipulation unit is formed to be smooth.

27. The mobile terminal of claim 26, wherein the manipulation unit is a single pad corresponding to a region from which the LCD outputs visual information.

28. The mobile terminal of claim 1, wherein the at least one dome switch disposed at the lower side of the LCD is overlapped by the signal display unit.

29. The mobile terminal of claim 9, wherein one of the touch sensor and the at least one dome switch is configured to be locked in a usage mode.

30. The mobile terminal of claim 1, wherein the at least one dome switch is a single dome switch and the at least one pressing protrusion is a single pressing protrusion formed to correspond to the single dome switch.

31. A mobile terminal comprising:
a housing;
a signal display unit disposed within the housing, the signal display unit being configured to selectively display one of at least two inputtable signal sets or other visual information different from the inputtable signal sets;
a manipulation unit disposed within the housing to cover the signal display unit, the manipulation unit being configured to allow light to be transmitted therethrough; and
an input unit disposed within the housing, the input unit being configured to receive at least one signal corresponding to the selectively displayed inputtable signal set,
wherein the input unit comprises:
a touch sensor disposed above the signal display unit and configured to sense a touch when the manipulation unit is touched; and
at least one dome switch disposed below the signal display unit and configured to be operated when being depressed by the signal display unit via the manipulation unit,
wherein the manipulation unit entirely covers the signal display unit,
wherein the housing includes a through hole and the manipulation unit is disposed in the through hole,
wherein the signal display unit is formed to be opaque entirely such that the at least one dome switch is not viewed from outside,
wherein the signal display unit is configured to display a virtual keyboard and a display region,
wherein information inputted by the virtual keyboard is displayed on the display region when the at least one dome switch is depressed by the signal display unit, in a state that the virtual keyboard and the display region have been displayed, and
wherein the information is not displayed unless the at least one dome switch is depressed by the signal display unit even though the virtual keyboard is touched in the state.

32. The mobile terminal of claim 30, wherein in a state that a virtual keyboard is displayed at the LCD, the LCD outputs information associated with the touched position not when the touch sensor senses the touched position but when the single dome is pressed by the LCD.

* * * * *